No. 656,861. Patented Aug. 28, 1900.
W. G. STEINICKE & A. F. BAUER.
KITCHEN CABINET.
(Application filed Feb. 12, 1900.)
(No Model.)
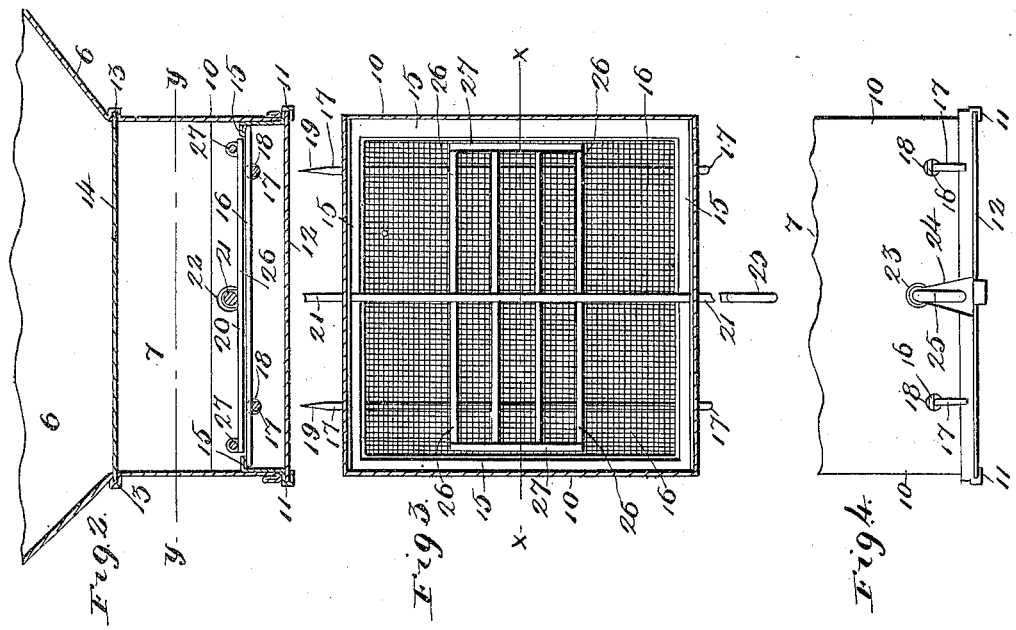
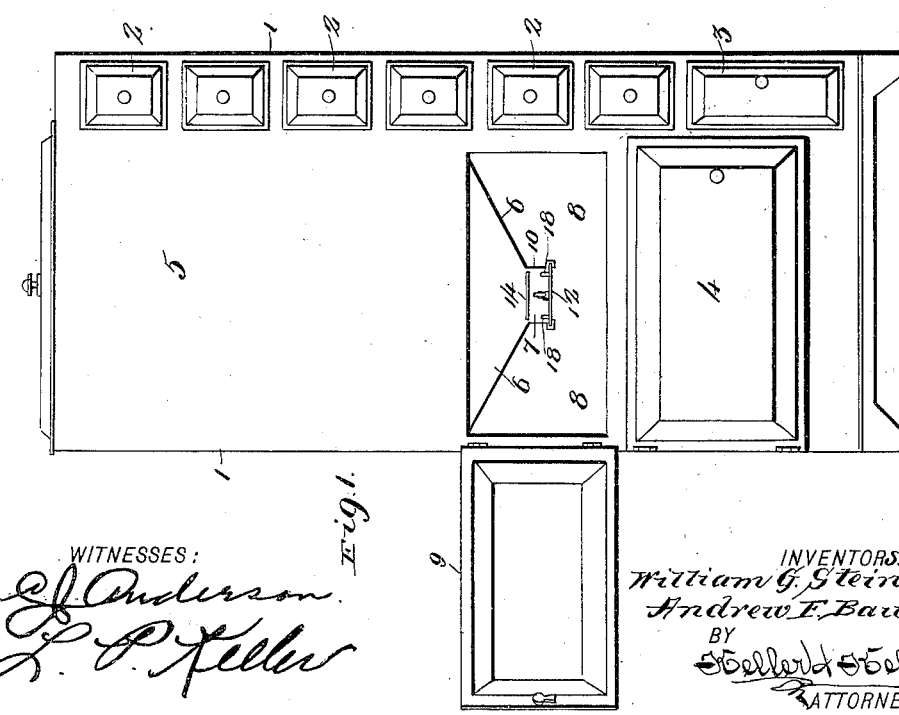
WITNESSES:
INVENTORS.
William G. Steinicke.
Andrew F. Bauer.
BY
ATTORNEYS.

UNITED STATES PATENT OFFICE.

WILLIAM G. STEINICKE AND ANDREW F. BAUER, OF ST. LOUIS, MISSOURI.

KITCHEN-CABINET.

SPECIFICATION forming part of Letters Patent No. 656,861, dated August 28, 1900.

Application filed February 12, 1900. Serial No. 4,972. (No model.)

*To all whom it may concern:*

Be it known that we, WILLIAM G. STEINICKE and ANDREW F. BAUER, citizens of the United States, residing at St. Louis, in the State of Missouri, have invented new and useful Improvements in Kitchen-Cabinets, of which the following is a specification.

Our invention relates to improvements in kitchen-cabinets; and it consists in the novel combination and arrangement of parts, as will be hereinafter more specifically described and claimed.

In the drawings, Figure 1 is a front elevation of our complete invention. Fig. 2 is a vertical section of the lower end of the hopper of the flour-bin, taken on the line $x\,x$ of Fig. 3, showing our improved flour-sifter. Fig. 3 is a cross-section taken on the line $y\,y$ of Fig. 2, showing the flour-sifter and its construction; and Fig. 4 is a side elevation of the lower end of the same.

The object of our invention is to combine with a kitchen-cabinet of suitable design a flour-sifter, forming the lower end of a suitable hopper contained within said cabinet; and it consists of an extension forming the lower or discharge end of said hopper, flanged plates secured within said extension, a screen or netting located below said plates, pointed rods adapted to be passed through suitable openings formed in the opposite sides of said extension and normally in contact with the lower surface of said screen for removably holding the latter in its proper position, said openings through which the rods are passed being larger than the rods, an agitator comprising a central operating-bar, the ends of which extend beyond the opposite walls of said extension, one of said walls being provided with a circular opening through which the bar of the agitator passes and the opposite or front wall provided with a slot with inclined walls having an upper circular extension within which the forward end of the bar of the agitator is normally located, all of which will appear from the detail description to follow.

Referring to the drawings, 1 represents a cabinet of any suitable shape or design and preferably constructed from sheet metal, the outer surfaces of which are japanned or painted in any shade or color and ornamented in any suitable manner, said cabinet being provided with a series of drawers 2, arranged in a line and located adjacent to one side of said cabinet, a receptacle 3 being located below said set of drawers for the reception of any suitable article of food, the drawers being adapted to receive or contain suitable spices or other ingredients necessary for cooking. Located to one side of the said receptacle and drawers and adjacent to the bottom of said cabinet is a closet 4, which is adapted to contain any suitable article of food—such as bread, cake, or pie—and forming the upper portion of said cabinet is a receptacle 5 for containing flour, the lower end of which terminates in a hopper 6, having a flour-sifter 7, located in the discharge end of the same, the said discharge end of the hopper being located in a space 8, formed in said cabinet, the said space being closed by a door 9 for covering said space when the sifter is not in use.

The lower or discharge end of the hopper 6 for containing the flour is composed of a rectangular-shaped extension 10, the lower edge of which is provided with guides 11 for receiving a slide 12 for preventing the flour located within the sifter from passing into the space 8 when the said sifter is not in use, and formed in said hopper, above the rectangular extension thereof, are guides 13 for receiving a similar slide-plate 14 for checking the body of the flour or preventing the same from gaining access to the sifter when the latter is not in use.

Secured within the rectangular extension 10 of the hopper are flanged plates 15, which are located a suitable distance above the lower edge of said extension, against the under surfaces of which a screen or netting 16 is adapted to be firmly held by rods 17, passed through openings 18, formed in the opposite walls of said extension, the said rods being located below said netting or frame around the same, whereby said screen or netting through which the flour is sifted is detachably secured in position within the extension 10 of the hopper, and consequently the same may be removed at any time should the netting thereof become worn or useless, and, further, the same may be removed for the purpose of cleaning the said netting should the same become filled with the flour, and thereby prevented from operating for properly sifting the flour. The openings 18, through which the rods 17 are passed, are somewhat larger than the latter, and one end of said rods is pointed, as shown at 19, which construction provides a ready and convenient means for inserting the said rods, and, further, operates to properly force the screen 16 against the flanged plates 15, whereby said screens are held in a rigid position.

Located within the extension 10 of the hopper and in movable contact with the upper surface of the screen or netting 16 is an agitator 20, which is adapted to be reciprocated over said screen by hand any suitable number of times to properly sift the flour through the screen and obtain the quantity desired for use, said agitator being composed of a central bar 21, which passes loosely through a rear or circular opening 22, formed in one of the walls of the extension 10 of the hopper, the opposite end of said bar being normally located in the circular extension 23, forming the upper end of a slot 24, the latter having inclined walls for properly guiding the said bar in its proper position or within the circular extension 23, the forward end of said bar being provided with an operating-handle 25, by means of which the agitator may be reciprocated.

Secured to the bar 21 are a series of longitudinal bars 26, the length of which substantially corresponds to the width of the screen or netting 16, and are separated a suitable distance apart to permit the flour to pass between the same to the screen or netting, and in order to hold said last-named bars in a rigid position in respect to one another short transverse bars 27 are attached to the free ends of said longitudinal bars, whereby all the parts comprising the agitator are rigidly held together in respect to one another.

When it is desired to remove the parts of the sifter for the purpose previously described, the rods 17 are first removed, in which operation the screen or netting 16 will readily drop out of the open or discharge end of the hopper, after which the agitator 20 may be easily removed by allowing the forward end of the bar 21 of the same to drop sufficiently to fall out of the slot 24 in the front wall of the extension 10 of the hopper, after which the rear end of the bar of the agitator may be pulled forward and removed from the opening 22.

Having fully described our invention, what we claim is—

In combination with a flour-bin, an extension forming the lower or discharge end of the same, flanged plates secured within said extension, a screen or netting located below said plates, pointed rods adapted to be passed through suitable openings formed in the opposite sides of said extension, and normally in contact with the lower surface of said screen for removably holding the latter in its proper position, said openings through which the rods are passed being larger than the rods, an agitator, comprising a central operating-bar, the ends of which extend beyond the opposite walls of said extension, one of said walls being provided with a circular opening through which the bar of the agitator passes, and the opposite or front wall provided with a slot with inclined walls, having an upper circular extension, within which the forward end of the bar of the agitator is normally located, as and for the purpose described.

In testimony whereof we affix our signatures in presence of two witnesses.

WILLIAM G. STEINICKE.
ANDREW F. BAUER.

Witnesses:
C. F. KELLER,
C. J. ANDERSON.